US007826499B2

(12) United States Patent
Nicholson et al.

(10) Patent No.: US 7,826,499 B2
(45) Date of Patent: Nov. 2, 2010

(54) VISIBLE CONTINUUM GENERATION UTILIZING A HYBRID OPTICAL SOURCE

(75) Inventors: Jeffrey W. Nicholson, Morristown, NJ (US); Siddharth Ramachandran, Hoboken, NJ (US)

(73) Assignee: OFS Fitel LLC, Norcross, GA (US)

( * ) Notice: Subject to any disclaimer, the term of this patent is extended or adjusted under 35 U.S.C. 154(b) by 383 days.

(21) Appl. No.: 11/888,844

(22) Filed: Aug. 2, 2007

(65) Prior Publication Data

US 2009/0034562 A1    Feb. 5, 2009

(51) Int. Cl.
*H01S 3/30* (2006.01)

(52) U.S. Cl. .......................... 372/6; 385/122; 385/123; 385/125

(58) Field of Classification Search .................... 372/6; 385/122, 123, 125
See application file for complete search history.

(56) References Cited

U.S. PATENT DOCUMENTS

| 7,529,278 | B2 * | 5/2009 | Liu ................. 372/6 |
| 2004/0057682 | A1 * | 3/2004 | Nicholson et al. ......... 385/122 |
| 2006/0209908 | A1 * | 9/2006 | Pedersen et al. ............ 372/6 |
| 2009/0028193 | A1 * | 1/2009 | Islam .......................... 372/6 |
| 2009/0129409 | A1 * | 5/2009 | Hirano et al. ............... 372/6 |
| 2009/0213877 | A1 * | 8/2009 | Tunnermann et al. ........ 372/6 |

FOREIGN PATENT DOCUMENTS

EP    1 801 643 A    6/2007

WO    WO 2005/062113    7/2005

OTHER PUBLICATIONS

P Maddaloni1, P Cancio2 and P De Natale1,2, "Optical comb generators for laser frequency measurement", IOP Publishing, Measurement Science and Technology, Meas. Sci. Technol. 20 (2009) 052001 (1-20 pages).*
J. W. Nicholson, R. Bise,J. Alonzo,1 T. Stockert, J. Trevor, Dimarcello,. Monberg, J. M. Fini,1 P. S. Westbrook,1 K. Feder, and L. Grüner-Nielsen, "Visible continuum generation using a femtosecond erbium-doped fiber laser and a silica nonlinear fiber", Optics Letters / vol. 33, No. 1 / Jan. 1, 2008 pp. 28-30.*

(Continued)

*Primary Examiner*—Minsun Harvey
*Assistant Examiner*—Delma R Forde

(57) ABSTRACT

An all-fiber supercontinuum source is formed as a hybrid combination of a first section of continuum-generating fiber (such as, for example, highly-nonlinear fiber (HNLF)) spliced to a second section of continuum-extending fiber (such as, for example, photonic crystal fiber (PCF)). The second section of fiber is selected to exhibit an anomalous dispersion value in the region of the short wavelength edge of the continuum generated by the first section of fiber. A femtosecond pulse laser source may be used to supply input pulses to the section of HNLF, and the section of PCF is spliced to the termination of the section of HNLF. A section of single mode fiber (SMF) is preferably inserted between the output of the laser source and the HNLF to compress the femtosecond pulses prior to entering the HNLF. It has been found that the hybrid combination of these two types of fibers allows for extension of the continuum on the short wavelength side—into the visible portion of the spectrum—by virtue of the first section of fiber acting as a "pump" source for the second section of fiber.

13 Claims, 1 Drawing Sheet

OTHER PUBLICATIONS

Encyclopedia of Laser Physics and Technology—supercontinuum generation, supercontin . . . p. 1 of 8, 2009.*

Norihiko Nishizawa and Jun Takayanagi."Octave spanning high-quality supercontinuum generation in all-fiber system" J. Opt. Soc. Am. B/vol. 24, No. 8/Aug. 2007, pp. 1786-1792.*

Takashi Hori, Norihiko Nishizawa, and Toshio Goto, "Experimental and numerical analysis of widely broadened upercontinuum generation in highly nonlinear dispersion-shifted fiber with a femtosecond pulse" vol. 21, No. 11/Nov. 2004/J. Opt. Soc. Am. B, pp. 1969-1980.*

J.W. Nicholson, S. Ramachandran and S. Ghalmi, "91 fs pulses from an Yb-doped figure-eight fiber-laser dispersion compensated with higher-order-mode fiber" 2007 Optical Society of America, pp. 1-2.*

J.W. Walewski et al, "Standard single-mode fibers as convenient means for the generation of ultrafast high-pulse-energy super-continua" Appl. Phys. B 83, 75-79 (2006).*

Shumin Zhang et al. "Supercontinuum generation in photonic crystal fibers with a normal dispersion pump pulse near the zero-dispersion wavelength" Optical Engineering 47(7), 075005 (Jul. 2008).*

Norihiko Nishizawa and Masaru Hori, "Octave Spanning High Quality Super Continuum Generation Using 10 nJ and 104 fs High Energy Ultrashort Soliton Pulse" Applied Physics Express 1 (2008).*

Jun Takayanagi and Norihiko Nishizawa, "Generation of Widely and Flatly Broadened, Low-Noise and High-Coherence Supercontinuum in All-Fiber System" Japanese Journal of Applied Physics vol. 45, No. 16, 2006, pp. L441-L443.*

S.V. Smirnov et al., "Optical spectral broadening and supercontinuum generation in telecom applications" Optical Fiber Technology 12 (2006) 122-147.*

P.S. Westbrook, J.W. Nicholson, K. Feder, and A.D. Yablon, "UV Processing of Highly Nonlinear Fibers for Enhanced Supercontinuum Generation" 2004 Optical Society of America.*

Ranka et al "Visible continuum generation in air-silica microstructure optical fiber with anomalous dispersion at 800 nm" Jan. 1, 2000/ vol. 25, No. 1/ Optical Letters pp. 25-27.*

Xiong, et al. "Visible Continuum Generation from a Microchip 1062 nm Laser Source", Lasers & Electro-Optics & 2006 Quantum Elect. and Laser Science Conf., May 21, 2006, p. 1-2.

Bolger, et al., "Tunable Spectral Enhancement of Supercontinuum with Long Period Gratings", COIN-ACOFT, Jun. 24, 2007, pp. 1-3.

Ranka, et al., "Visible Continuum Generation in air-silica microstructure optical fibers with anomalous dispersion at 800 nm", Optics Letters, Jun. 1, 2000 vol. 25 No. 1 p. 25-27.

Knight, et al., "Anomalous Dispersion in Photonic Crystal Fiber", IEEE Photonics Technology Letters, vol. 12, No. 7, Jul. 1, 2000, p. 807-809.

* cited by examiner

VISIBLE CONTINUUM GENERATION UTILIZING A HYBRID OPTICAL SOURCE

TECHNICAL FIELD

The present invention relates to a supercontinuum source capable of generating radiation well into the visible portion of the spectrum, useful for frequency metrology and other applications.

BACKGROUND OF THE INVENTION

Light radiation propagating through a nonlinear medium experiences a spectral broadening that can be very substantial (up to two octaves or more) under certain conditions. In early experiments exploiting optical fibers, continuum was formed by broadening and merging separate spectral lines, generated as a result of stimulated Raman scattering (SRS) and four-wave mixing (FWM). Phase matching conditions for the latter were met as a result of multi-mode propagation of light through the fiber. The growing interest to the phenomenon of continuum generation has led to a steady progress in the understanding of the interplay between the different nonlinear processes affecting high power radiation evolution in the optical fiber waveguide.

From a purely practical point of view, progress has also been impressive and has allowed, for example, the generation of supercontinuum radiation with spectral widths in excess of several hundreds of nanometers in microstructured, tapered and highly-nonlinear fibers (HNLF). U.S. Pat. No. 6,775,447, issued to J. W. Nicholson et al. on Aug. 10, 2004 and assigned to the assignee of this application, describes an all-fiber supercontinuum source based on a number of separate sections of HNLF joined together, where each has a different dispersion at the operating wavelength and are joined together so that the dispersion decreases along the length of the HNLF sections. The resultant Nicholson et al. all-fiber source is thus able to generate a continuum spanning more than an octave. While this source is advantageous in all manner of systems where an all-fiber configuration is preferred, the generated supercontinuum bandwidth does not extend into the lower end of the spectrum (i.e., into the visible region) that is considered to be useful in many applications.

Indeed, many of the frequencies that are useful for frequency metrology are in the visible portion of the spectrum, well below the range that has traditionally been used for optical communication applications. Presently, optical standards for frequency metrology at 657 nm (a "visible" wavelength) are now accessed by infrared combs using a frequency doubling technique requiring additional signal paths and nonlinear optical devices. It is preferable to reach this frequency standard directly (with supercontinuum), without the need for the additional nonlinear optical components required to perform frequency doubling. However, the current supercontinuum generated by 1550 nm pump lasers generally do not extend to wavelengths much shorter than 850 nm.

Thus, a need remains in the art for a supercontinuum source capable of generating visible-range radiation without requiring the use of additional nonlinear optical components.

SUMMARY OF THE INVENTION

The need remaining in the art is addressed by the present invention, which relates to a supercontinuum source capable of generating radiation in the visible portion of the spectrum, useful for frequency metrology and other applications.

In accordance with the present invention, an all-fiber supercontinuum source is formed as a hybrid combination of at least two concatenated sections of fiber, a first section used to create an initial continuum spectrum and increase the optical peak power through higher-order soliton compression and a second section configured to exhibit an anomalous dispersion characteristic (i.e., the second derivative of the effective index with respect to frequency is negative) substantially near the short wavelength edge of the continuum generated by the first section (for example, within about ±200 nm of the short wavelength edge). This combination has been found to increase the wavelength range of the generated continuum on the short wavelength side, extending into the visible range that has heretofore been difficult to realize.

In one embodiment of the present invention, the hybrid combination may comprise a section of highly-nonlinear fiber (HNLF) as the "first" section used to generate the initial continuum. The HNLF section is concatenated to a section of photonic crystal fiber (PCF), where the PCF is configured to provide the extended continuum into the visible range. In one particular arrangement, the HNLF is responsive to the output of a femtosecond pulse laser source, and the section of PCF is spliced to the termination of the section of HNLF. A section of single mode fiber (SMF) is preferably inserted between the output of the laser source and the HNLF to compress the femtosecond pulses prior to entering the HNLF. It has been found that the hybrid combination of HNLF with PCF allows for extension of the continuum on the short wavelength side—into the visible portion of the spectrum—by virtue of the HNLF acting as a "pump" source for the PCF.

The "section" of HNLF may itself comprise one or more lengths of HNLF having different dispersion values, as described in the above-cited Nicholson et al. reference, allowing for the short wavelength end of the hybrid continuum source to be even further extended into the visible regime.

A differently-configured section of PCF may be used in place of the HNLF as the "first" section of fiber to generate the initial continuum. Further, a section of "higher order mode" (HOM) fiber may be used in place of PCF fiber as the "second section" of fiber. In general, the first section of fiber used in the inventive hybrid all-fiber continuum source is selected to exhibit an anomalous dispersion between 0.10 and 10 ps/nm-km, a dispersion slope between −0.02 and +0.02 ps/nm²-km, and a relatively small effective area ($A_{eff}$), less than (for example) 15 µm². The second section of fiber utilized in the inventive source is required to exhibit an anomalous dispersion characteristic substantially near the short wavelength edge of the continuum generated by the first section so that the continuum is further broadened into the visible wavelength regime (this short wavelength edge may be, for example, anywhere in the range of 850-1200 nm).

Other and further sources and arrangements of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
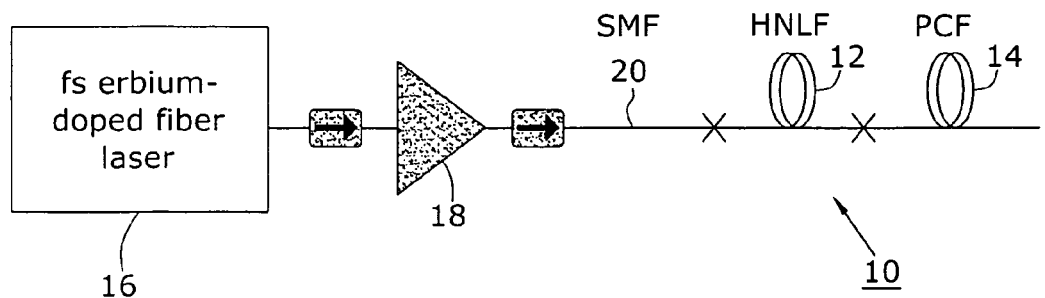
FIG. 1 illustrates an exemplary hybrid, all-fiber optical continuum source formed in accordance with the present invention.

FIG. 1 illustrates an exemplary hybrid, all-fiber continuum generation source 10 formed in accordance with the present invention. The "hybrid" source comprises a first section 12 of optical fiber capable of generating a continuum when a pulse of femtosecond pulses propagates therethrough. A second section 14 of optical fiber is spliced to the termination of first section 12 to form a concatenated, hybrid all-fiber device, where second section 14 is selected to have an anomalous dispersion characteristic near the short wavelength edge of the continuum generated by first section 12 to cause the generate of an extended continuum into the visible wavelength regime.

Preferably, first fiber section 12 exhibits an anomalous dispersion near the source wavelength in the range of 0.1-10.0 ps/nm-km, a relatively low dispersion slope in the range of −0.02 to +0.02 ps/nm$^2$-km, and a relatively small effective area (15 μm$^2$). In one embodiment, a section of highly-nonlinear fiber (HNLF) may be used as first fiber section 12 to generate this initial continuum. Further, the anomalous dispersion near the source wavelength of HNLF increases the peak power of the launched pulses through higher-order soliton compression. Highly-nonlinear fiber is generally defined as a solid silica-based fiber doped with germanium and fluorine to create an index profile with the above-described dispersion and modal area properties. Other materials, such as chalcogenides or tellurites may also be used to provide the desired optical characteristics. A section of photonic crystal fiber (PCF) may be used as second fiber section 14 to extend the generated continuum into the visible wavelength range. Photonic crystal fiber is generally defined as a solid core fiber having a plurality of air channels formed in the cladding layer to run longitudinally along the fiber. The air channels function to modify the index of the cladding, allowing for a very high refractive index between the core and cladding to be obtained. The materials utilized to form second fiber section 14 may be silica-cased, or based on other materials with different nonlinear and material dispersion characteristics.

Referring back to FIG. 1, continuum generation source 10 of the present invention further comprises a source of extremely short (e.g., femtosecond length) optical pulses 16. Other pulse sources having a suitable power may be used as alternatives. As is well-known in the art of fiber-based continuum generation, nonlinear reactions within the fiber are greatly effected by fiber properties such as effective area ($A_{eff}$) and dispersion. Fiber dispersion governs how quickly a launched pulse will spread in the time domain and, as a result, how quickly the peak power of the pulse will increase/decrease as it propagates along the fiber ("increase" vs. "decrease" depending on the sign of the dispersion). The effective area $A_{eff}$ determines the magnitude of the nonlinear reactions within the fiber itself, where the peak intensity of the pulse will be larger for fibers with a smaller $A_{eff}$. If the dispersion of first fiber section 12 is in the anomalous regime, and $A_{eff}$ is sufficiently small for a given input pulse peak power, then nonlinear reactions will induce generation of light at additional optical wavelengths and an initial continuum will be generated at the output termination. Pulse source 16, therefore, is used to inject a train of pulses into first fiber section 12 to provide the initial portion of the desired spectral broadening.

In one exemplary embodiment, source 16 comprises an erbium-doped fiber laser for producing femtosecond-duration optical pulses P. Pulses P are then applied as an input to an optical amplifier 18, such as an erbium-doped fiber amplifier, to create amplified pulses AP. Amplified pulses AP are then coupled into a section of single mode fiber 20, where single mode fiber 20 is utilized to provide pulse compression (in the time domain). It has been realized that the use of pulse compression results in broadening the bandwidth of the generated continuum. The amplified and compressed optical pulses are then injected to first fiber section 12. As stated above, fibers such as HNLF and PCF may be formed to exhibit these desired continuum-generating characteristics (anomalous dispersion, dispersion slope and effective area).

In accordance with the present invention, the initial "broadened" pulses developed within first fiber section 12 are thereafter applied as an input to second fiber section 14. Second fiber section 14 is utilized to further extend the bandwidth of the generated continuum into the visible range via self-phase modulation (SPM), for example. Since second fiber section 14 is configured to have a relatively small mode field diameter, self-phase modulation (SPM) and other nonlinear reactions can be very large, and the bandwidth significantly extended. In one embodiment, a section of nonlinear PCF may be used as second fiber section 14, since nonlinear PCF offers very special properties for both dispersion and nonlinear reactions. For example, the use of longitudinal air channels in the cladding can create a relatively high core effective index (compared to that conventionally used in solid fibers, even HNLF). This large core effective index can be used to reduce the physical core diameter, while maintaining robust index-guiding propagation, resulting in the small mode field diameter that produces very high effective nonlinearity. Additionally, the small diameter, high effective index core will exhibit very high waveguide dispersion that can shift the zero-dispersion wavelength significantly shorter than 1.3 μm. These features allow for strong nonlinear interaction over a significant length of fiber.

Such dispersion properties may also be achieved using higher-order modes (HOM) in a solid fiber, rather than the fundamental mode. In fact, it has been shown that HOM fibers may create a wide range of dispersion properties. While the effective area of HOM fibers is rather large for continuum generation, suitable nonlinear reactions can be created using fiber designs that reduce $A_{eff}$ of the section of HOM, or using pulses with sufficiently high power.

Figure 2:
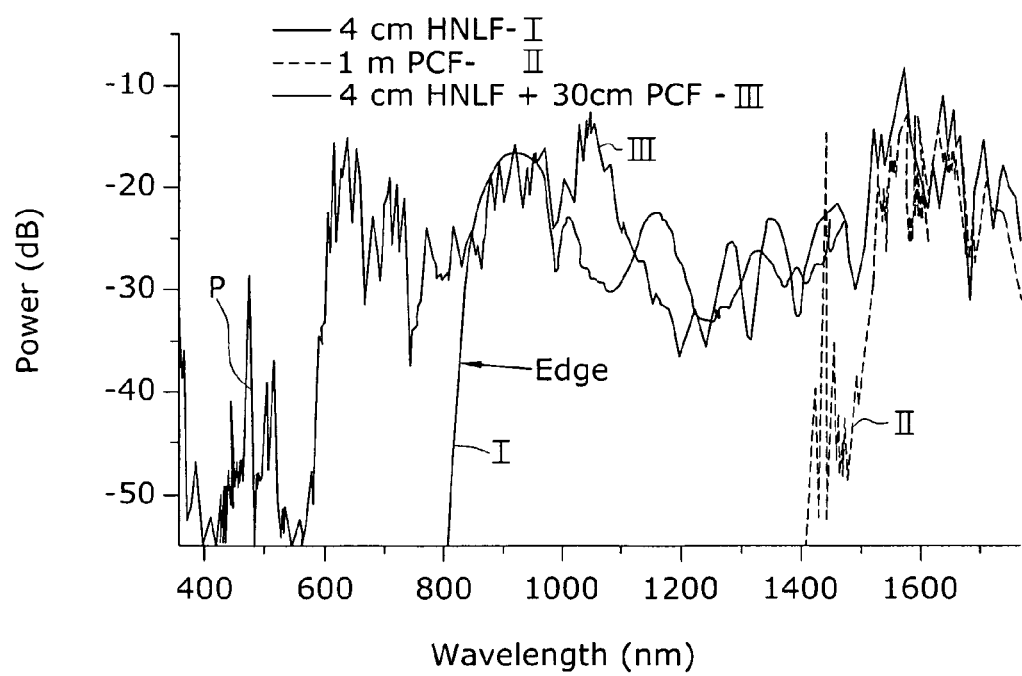
FIG. 2 is a plot of generated continuum, showing both conventional, prior art generated continua for two arrangements, as compared to the visible-wavelength-extended continuum generated by the hybrid arrangement of the present invention.

A first "prior art" plot shown in FIG. 2 (plot I) is associated with the continuum generated by using only a section of HNLF as the "output" of the source, where the use of HNLF to generate spectral broadening is known from the prior art. The section of HNLF is shown as generating a continuum with a short wavelength "edge" at approximately 800 nm, with only a single, very weak, narrow peak P below this edge. For the purposes of the present invention, the term wavelength "edge" is defined as the location along the continuum where there is a significant drop in spectral density from the peak power spectral density value (for example, 40 dB below the peak value). Thus, the use of only HNLF for generating visible wavelengths (below, for example, 650 nm) is not a viable solution. Inasmuch as PCF is itself nonlinear, it is also possible to form spectral broadening by using only this type of fiber. However, the use of PCF in place of HNLF results in generating a relatively narrow continuum, as shown in plot II of FIG. 2. In this case, the use of only PCF generates a continuum with little, if any, energy below the wavelength of 1400 nm.

In accordance with the present invention, these limitations are overcome by utilizing a combination of first fiber section 12 and second fiber section 14, in the manner shown in FIG. 1, to extend the continuum bandwidth well into the visible range. The continuum spectrum for this arrangement of the present invention is shown in plot III of FIG. 2, in this case using a section of HNLF for first section 12 and a second of PCF for second section 14. As shown, there is a significant amount of power in the wavelength range from 600-800 nm, with additional power in the range below 600 nm.

In the particular embodiment utilized to generate these results, HNLF 12 was selected to have a length of 4 cm and an effective area $A_{eff}$ on the order of 14 µm², and PCF 14 was configured to have a length of 30 cm, a core size of 1.9 microns, an effective area $A_{eff}$ of approximately 3 µm² and a zero dispersion wavelength (ZDW) of approximately 840 nm. In another experimental arrangement, a section of PCF have a ZDW of 1 micron was found to also generate visible light (again, used with a section of HNLF with a short wavelength edge of about 800 nm). The utilization of PCF 14 has been found to add significant spectral broadening since the short wavelength edge of the continuum produced in HNLF 12 forms an effective pump source for PCF 14, whose anomalous dispersion (e.g., 840 nm, 1 micron) is substantially near the short wavelength edge of the HNLF continuum (e.g., ±200 nm or less of the short wavelength edge).

Thus, a significant improvement in continuum generation on the short wavelength side of a conventional HNLF-based optical source can be easily achieved by splicing a section of PCF onto the output of the device. Indeed, it is further possible to utilize an arrangement comprising a concatenated length of different sections of HNLF, with decreasing dispersion values, with a section of PCF coupled to the final section of HNLF.

It will be apparent to those skilled in the art that various modifications and variations of the present invention can be made without departing form the spirit and scope thereof. Thus, it is intended that the present invention include the modifications and variations of this invention, provided they come within the scope of the appended claims and their equivalents.

What is claimed is:

1. A supercontinuum source comprising
a source of light pulses having a predetermined wavelength;
a first section of continuum-generating optical fiber disposed to receive the light pulses generated by the source of light pulses, the first section of continuum-generating optical fiber having an anomalous dispersion characteristic at the predetermined wavelength and configured to generate initial spectral broadening of the light pulses into an initial continuum defined as including a short wavelength edge; and
a second section of continuum-generating optical fiber coupled to the first section of continuum-generating optical fiber, the second section of continuum-generating optical having an anomalous dispersion characteristic at a wavelength substantially near the short wavelength edge of the initial continuum generated by the first section of continuum-generating optical fiber, utilizing the short wavelength edge of the initial continuum as a pump source to generate spectral broadening of the initial continuum by extending the continuum into the visible portion of the spectrum, forming an extended continuum output of a bandwidth greater than the initial continuum.

2. The supercontinuum source as defined in claim 1 wherein the source further comprises
a section of single mode fiber coupled between the source of light pulses and the first section of continuum-generating optical fiber, the section of single mode fiber providing time-based compression of the light pulses generated by said source of light pulses.

3. The supercontinuum source as defined in claim 1 wherein the source of light pulses comprises a fiber laser source.

4. The supercontinuum source as defined in claim 3 wherein the fiber laser source comprises an erbium-doped fiber laser for generating femtosecond light pulses.

5. The supercontinuum source as defined in claim 1 wherein the first section of continuum-generating optical fiber is formed to exhibit an anomalous dispersion within the general range of 0.1 to 10 ps/km-nm, a dispersion slope generally within the range of about −0.2 ps/nm²-km to about +0.2 ps/nm²-km, and an effective area less than approximately 15 µm at the predetermined wavelength.

6. The supercontinuum source as defined in claim 1 wherein the first section of continuum-generating optical fiber comprises a section of photonic crystal fiber.

7. The supercontinuum source as defined in claim 1 wherein the second section of continuum-generating optical fiber comprises a section of photonic crystal fiber.

8. The supercontinuum source as defined in claim 7 wherein the section of photonic crystal fiber comprises an effective area $A_{eff}$ of approximately 3 µm², a zero dispersion wavelength of approximately 840 nm, and a core diameter of 1.9 µm.

9. The supercontinuum source as defined in claim 1 wherein the second section of continuum-generating optical fiber comprises a section of higher-order mode (HOM) fiber.

10. The supercontinuum as defined in claim 1 wherein the first section of continuum-generating optical fiber comprises a plurality of separate concatenated optical fiber segments, each segment having a different dispersion value at the predetermined wavelength associated with the source of light pulses.

11. The supercontinuum as defined in claim 1 wherein the second section of continuum-generating optical fiber exhibits an anomalous dispersion characteristic at a wavelength within approximately ±200 nm of the short wavelength edge of the initial continuum generated by the first section of continuum-generating optical fiber.

12. The supercontinuum source as defined in claim 1 wherein the short wavelength edge of the initial continuum generated by the first section of continuum-generating optical fiber is defined as the location along the initial continuum where there is a significant drop in spectral density below a defined peak density value.

13. The supercontinuum source as defined in claim 12 wherein a drop in spectral density on the order of approximately 40 dB below the peak spectral density value is used to define the short wavelength edge of the initial continuum.

* * * * *